US008805277B2

(12) United States Patent
Ibrahim et al.

(10) Patent No.: US 8,805,277 B2
(45) Date of Patent: Aug. 12, 2014

(54) METHOD AND SYSTEM FOR BLUETOOTH 802.11 ALTERNATE MAC/PHY (AMP) TRANSMIT POWER CONTROL (TPC)

(75) Inventors: Brima Ibrahim, Aliso Viejo, CA (US); Raymond Hayes, Los Gatos, CA (US); Jeyhan Karaoguz, Irvine, CA (US); John Walley, Ladera Ranch, CA (US); Saishankar Nandagopalan, San Diego, CA (US); Robert Hulvey, Redondo Beach, CA (US); Shawn Ding, San Diego, CA (US); Christopher Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 480 days.

(21) Appl. No.: 12/502,793

(22) Filed: Jul. 14, 2009

(65) Prior Publication Data

US 2010/0009632 A1    Jan. 14, 2010

Related U.S. Application Data

(60) Provisional application No. 61/080,520, filed on Jul. 14, 2008.

(51) Int. Cl.
*H04B 7/00*    (2006.01)
(52) U.S. Cl.
USPC ............... 455/41.2; 455/67.11; 455/552.1
(58) Field of Classification Search
USPC ........ 455/41.1, 41.2, 41.3, 522, 552.1, 67.11, 455/67.13, 67.14
See application file for complete search history.

(56) References Cited

U.S. PATENT DOCUMENTS

| | | | |
|---|---|---|---|
| 7,865,142 B2* | 1/2011 | Hansen et al. | 455/41.2 |
| 2004/0242258 A1 | 12/2004 | Kim | |
| 2006/0159038 A1* | 7/2006 | Hasty et al. | 370/315 |
| 2008/0070504 A1* | 3/2008 | Benkert et al. | 455/41.2 |
| 2009/0034498 A1* | 2/2009 | Banerjea et al. | 370/338 |

FOREIGN PATENT DOCUMENTS

KR    10 2004 0099287    11/2004

OTHER PUBLICATIONS

International Preliminary Report on Patentability dated Jan. 18, 2011 in Application PCT/US2009/050490.
International Search Report and Written Opinion for PCT International Application No. PCT/US2009/050490 dated Sep. 8, 2009.
KR Office Action (Issued Apr. 12, 2012).
English Translation of KR Office Action (Issued Apr. 12, 2012).

* cited by examiner

*Primary Examiner* — Ping Hsieh
(74) *Attorney, Agent, or Firm* — McDermott Will & Emery LLP

(57) ABSTRACT

Aspects of a method and system for Bluetooth 802.11 alternate MAC/PHY (AMP) transmit power control (TPC) may include one or more processors, receiver circuits and/or transmitter circuits that are operable to determine a maximum input level based on signals received via a Bluetooth basic rate (BR) connection and/or via a Bluetooth extended data rate (EDR) connection. The processors and/or circuits may be operable to determine a transmitted signal power level based on the determined maximum input level. The processors and/or circuits may be operable to transmit subsequent signals via a distinct Bluetooth connection based on the determined transmitted signal power level. The data rate for signal transmission via the distinct Bluetooth connection may exceed the data rate for signal transmission via the BR connection and the data rate for signal transmission via the EDR connection.

21 Claims, 4 Drawing Sheets

METHOD AND SYSTEM FOR BLUETOOTH 802.11 ALTERNATE MAC/PHY (AMP) TRANSMIT POWER CONTROL (TPC)

CROSS-REFERENCE TO RELATED APPLICATIONS/INCORPORATION BY REFERENCE

This application makes reference to, claims priority to, and claims the benefit of U.S. Provisional Application Ser. No. 61/080,520, filed Jul. 14, 2008.

The above reference application is hereby incorporated herein by reference in its entirety.

FIELD OF THE INVENTION

Certain embodiments of the invention relate to communications networks. More specifically, certain embodiments of the invention relate to a method and system for Bluetooth 802.11 alternate MAC/PHY (AMP) transmit power control (TPC).

BACKGROUND OF THE INVENTION

Bluetooth is a short range wireless communications technology that enables wireless connection between consumer and computer equipment, while eliminating wires. Equipment that is operable to utilize Bluetooth technology may be referred to as Bluetooth devices. Bluetooth devices within a range of approximately 10 meters of each other may communicate utilizing a 2.4 gigahertz frequency band. Examples of Bluetooth devices may comprise personal digital assistants (PDA), headsets, telephones, home audio/video equipment, medical and sports monitoring devices, and computers. Capabilities enabled by Bluetooth technology may comprise eliminating cables linking computers to printers, keyboards, and mouse devices, making calls from a wireless headset connected via wireless link to a wired or wireless telephone, and the playing of audio from a portable MP3 player via a home audiovisual system with no wired connection between the MP3 player and the home audiovisual system.

Basic rate (BR) Bluetooth radio transmission, as described in the Bluetooth (BT) Core Specification version 1.1, may support data rates as high as 1 Mbit/s. The extended data rate (EDR) option for Bluetooth radio transmission, as described in the BT Core Specification version 2.1, may support data rates as high as 3 Mbits/s. BT Core Specification version 3.0+High Speed (+HS) may support data rates as high as 24 Mbits/s. +HS sets forth an adaptation of one or more 802.11 radio means as specified in relevant IEEE specifications and/or standards, such as IEEE 802.11a, IEEE 802.11b, IEEE 802.11g and/or IEEE 802.11n. This adaptation is referred to as a Bluetooth 802.11 alternate medium access control layer and physical layer (AMP).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for Bluetooth 802.11 alternate MAC/PHY (AMP) transmit power control (TPC), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
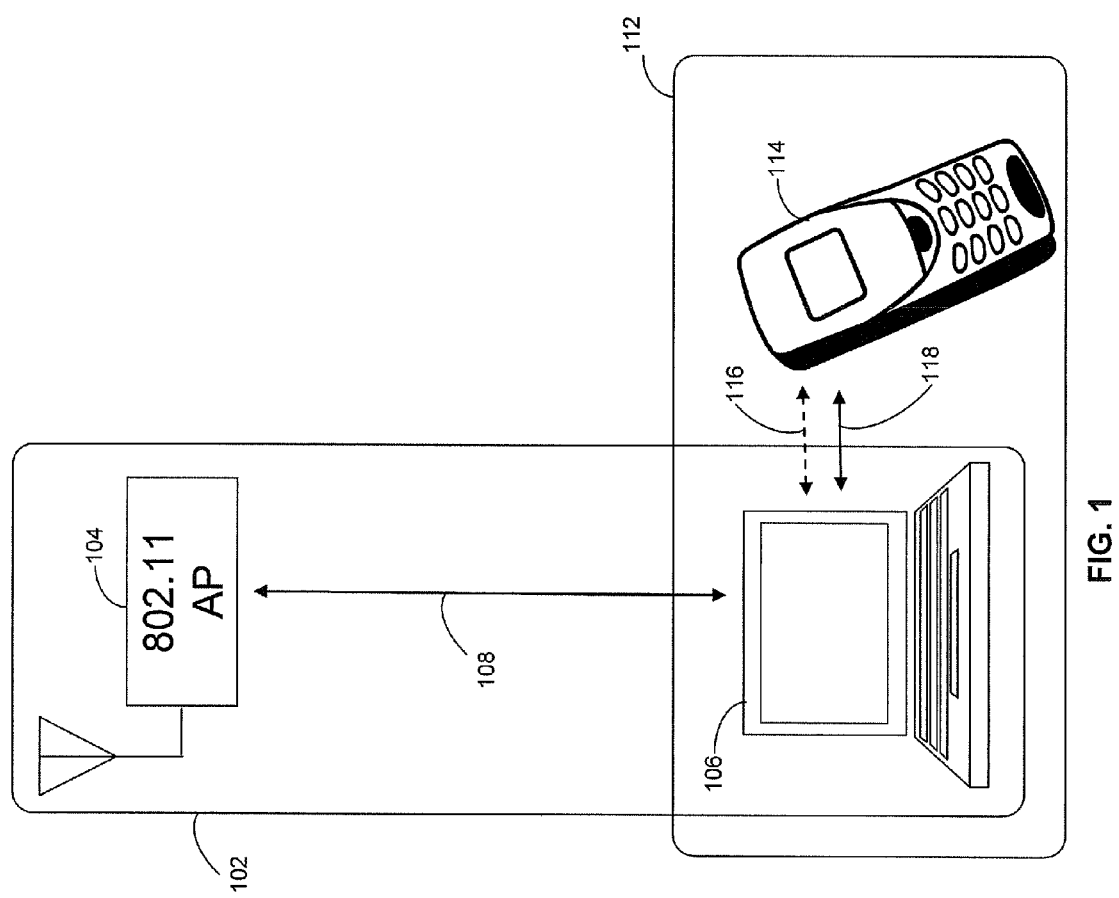
FIG. 1 is a diagram that shows exemplary Bluetooth 802.11 AMP communication, which may be utilized in connection with an embodiment of the invention.

Certain embodiments of the invention may be found in a method and system for Bluetooth 802.11 alternate MAC/PHY (AMP) transmit power control (TPC). In various embodiments of the invention a Bluetooth (BT) 802.11 AMP wireless communication device, which is able to communicate in an 802.11 wireless local area network (WLAN) and/or a BT personal area network (PAN), may receive maximum input level (MIL) information from one or more BT communication devices via the PAN. The BT communication devices may utilize BT BR and/or BT EDR radio transmission to communicate the MIL to the BT 802.11 AMP communication device. The communication of the MIL may occur during an association phase within the PAN. The BT 802.11 AMP communication device may determine a path loss level for signals transmitted to communication devices within the PAN. Based on the MIL information and the determined path loss, the BT 802.11 AMP communication device may determine an amplitude level for signals that may be subsequently transmitted to one or more communication devices within the PAN. The subsequent signals may be transmitted by the BT 802.11 AMP communication device utilizing AMP radio transmission. The control of the amplitude level for the subsequently transmitted signals, which utilize AMP radio transmission, may be referred to as BT 802.11 AMP TPC, in accordance with various embodiments of the invention.

The transmitted power level for signals transmitted by a transmitting device, device_A, may results in a received power level at which the transmitted signals are received at a receiving device, device_B, as shown in the following equation:

$$RX\_input\_level(device\_B) = TX\_power\_level(device\_A) - path\_loss(AB) \quad [1]$$

where TX_power_level(device_A) represents the transmitted power level for signals transmitted by device_A, RX_input_level(device_B) represents the received power level at which the signals transmitted by device_A are received at device_B and the path_loss(AB) represents a measure of attenuation of signals transmitted by device_A along a propagation path to device_B. The value of the path_loss(AB) may be a function of the distance of the propagation path from device_A to device_B.

The device_B may have a maximum power level at which it may receive signals. This maximum power level may be referred to as a maximum input level (MIL), which may be represented as shown in the following equation:

$$MIL(device\_B) = \max(RX\_input\_level(device\_B)) \quad [2]$$

In various embodiments of the invention, a transmitting device_A may determine a value for TX_power_level(device_A) for signals that are transmitted to a receiving device_B based on an MIL(device_B) value. The BT 802.11 AMP TPC may comprise determining the TX_power_level(device_A) value, which may represent a maximum transmitted power level for signals transmitted by device_A. The transmitting device_A may be operable to determine the MIL(device_B) value based on MIL information communicated by device_B to device_A. The transmitting device_A may also be operable to determine the MIL(device_B) value based on signals received by device_A and/or based on a minimum input level.

FIG. 1 is a diagram shows exemplary Bluetooth 802.11 AMP communication, in accordance with an embodiment of the invention. Referring to FIG. 1, there is shown a WLAN basic service set (BSS) 102 and a PAN 112. The WLAN BSS 102 may comprise an access point (AP) 104 and a personal computer (PC) 106. The PAN 112 may comprise a PC 106 and a mobile telephone 114.

The WLAN BSS 102 may comprise suitable devices and/or interfaces that are operable to communicate wirelessly via RF signals that are transmitted by a transmitting station (STA) device, for example the PC 106, and received by a receiving STA device, for example the AP 104.

The PAN 112 may comprise suitable devices and/or interfaces that may be operable to communicate wirelessly via RF signals that are transmitted by a transmitting BT device, for example the PC 106, and received by a receiving BT device, for example the mobile telephone 114.

The AP 104 may comprise suitable logic, circuitry, interfaces and/or code that may be operable to communicate with one or more STA devices in a WLAN BSS 102 via transmitted and/or received RF signals.

The PC 106 may comprise suitable logic, circuitry, interfaces and/or code that may be operable to communicate with one or more STA devices in a WLAN BSS 102 via transmitted and/or received RF signals. The PC 106 may comprise suitable logic, circuitry and/or code that may be operable to communicate with one or more BT devices in a BT PAN 112 via RF signals that are transmitted by a transmitting BT device, for example the PC 106, and received by a receiving BT device, for example the mobile telephone 114.

The AP 104 and the PC 106 may communicate via an 802.11 connection 108. An exemplary 802.11 connection 108 may comprise RF signals that are transmitted by the PC 106 and received by the AP 104, and/or RF signals that are transmitted by the AP 104 and received by the PC 106. The PC 106 may utilize medium access control (MAC) layer and/or physical (PHY) layer functionality as specified in relevant IEEE specifications and/or standards, such as IEEE 802.11a, IEEE 802.11b, IEEE 802.11g and/or IEEE 802.11n, for signals transmitted via the 802.11 connection 108.

The PC 106 and the mobile telephone 114 may establish communication within the PAN 112 during a communication exchange referred to as an association phase. The association phase may comprise RF signals that are transmitted between the PC 106 and the mobile telephone 114 via a BT BR/EDR connection 116. The BT BR/EDR connection 116 may comprise RF signals that are transmitted by the PC 106 and received by the mobile telephone 114 and/or RF signals that are transmitted by the mobile telephone 114 and received by the PC 106. The PC 106 may utilize the BT BR radio transmission and/or the BT EDR radio transmission for RF signals transmitted via the BT BR/EDR connection 116.

In various embodiments of the invention, the mobile telephone 114 may be operable to transmit minimum input level (MIL) information to the PC 106 via the BT BR/EDR connection 116, for example, during the association phase. The MIL information may enable the PC 106 to determine a maximum signal level for RF signals received by the mobile telephone 114. In an exemplary embodiment of the invention, the MIL may be expressed in units of dB and/or dBm. The PC 106 may determine a path loss measure for signals transmitted via the BT BR/EDR connection 116. In an exemplary embodiment of the invention, the path loss may be expressed in units of dB and/or dBm.

Based on the MIL and path loss information, the PC 106 may determine a maximum signal power level, max(TX_power_level(PC)), for signals subsequently transmitted by the PC 106 to the mobile telephone 114 via the BT 802.11 AMP connection 118. The maximum signal power level may be determined as shown in the following equation:

$$\max(TX\_power\_level(PC)) = MIL(MT) + path\_loss(PC\_MT) \quad [3]$$

where TX_power_level(PC) refers to the transmitter power level for signals transmitted by the PC 106 to the mobile telephone 114 via the BT 802.11 AMP connection 118, MIL (MT) refers to the MIL for signals received by the mobile telephone 114 and path_loss(PC_MT) refers to the path loss for the signal propagation path between the PC 106 and the mobile telephone 114. In various embodiments of the invention, the path loss value represented in equation [3], path_loss (PC_MT), may comprise an estimate of the actual path loss value for the signal propagation path from the PC 106 to the mobile telephone 114.

As shown in equation [3], the max(TX_power_level(PC)) value may be determined based on the MIL(MT) value and the path_loss(PC_MT) value. In determining the max(TX_power_level(PC)) value for signals transmitted via the BT 802.11 AMP connection 118, the PC 106 may practice BT 802.11 AMP TPC. The PC 106 may determine the MIL(MT) value based on MIL information that is communicated by the mobile telephone 114 to the PC 106 via the BT BR/EDR connection 116 during a BT association phase.

In an exemplary embodiment of the invention, given the MIL(MT) value, the PC 106 may determine a path_loss (PC_MT) value by measuring a BT received signal strength indication (RSSI) value for signals received by the PC 106 that were transmitted by the mobile telephone 114 via the BT BR/EDR connection 116 during the association phase. The PC 106 may be operable to compute a BT RSSI value based on preamble information transmitted by the mobile telephone 114 and received by the PC 106 via the received signals. In this instance, the PC 106 may infer a transmitted power level for signals transmitted by the mobile telephone 114 and then estimate the path_loss(PC_MT) value based on the BT RSSI value. Based on the received MIL(MT) value and the estimated path_loss(PC_MT) value, the PC 106 may determine the max(TX_power_level(PC)) as shown in equation [3].

In an exemplary embodiment of the invention, the PC 106 may determine the path_loss(PC_MT) value by measuring an 802.11 RSSI value for signals received by the PC 106 that were transmitted by the AP 104 via the 802.11 connection 108. The PC 106 may compute the 802.11 RSSI value based on preamble information transmitted by the AP 104 and received by the PC 106 via the received signals. In this regard, the PC 106 may infer a transmitted power level for signals transmitted by the AP 104 and then estimate a path loss value, path_loss(AP_PC), based on the 802.11 RSSI value. The PC 106 may estimate a length for the signal propagation path, AP_PC_path_length, from the AP 104 to the PC 106 based on the path_loss(AP_PC) value. In instances where the AP_PC_path_length is comparable to a path length of BT signal transmission, the PC 106 may estimate a value for path_loss (PC_MT) based on the estimated value path_loss(AP_PC). Based on the received MIL(MT) value and the estimated path_loss(PC_MT) value, the PC 106 may determine the max(TX_power_level(PC)) as shown in equation [3].

In an exemplary embodiment of the invention, the PC 106 may utilize a default path_loss_def value. In an exemplary embodiment of the invention, path_loss_def=24 dB. In this instance, the PC 106 may select a transmitted power level value, TX_power_level_sel(PC), for signals transmitted by the PC 106 to the mobile telephone 114 via the BT 802.11 AMP connection 118. In an exemplary embodiment of the invention, the TX_power_level_sel(PC) value may be selected based on data throughput maximization criteria. For example, based on signals previously received via the 802.11 connection 108, the BT BR/EDR connection 116 and/or the BT 802.11 AMP connection 118, the PC 106 may compute one or more channel estimate values. Based on the computed channel estimate values, the PC 106 may compute a signal to noise (SNR) value for the BT 802.11 AMP connection 118. Based on the computed SNR value, the PC 106 may select the TX_power_level_sel(PC) value.

Based on the selected TX_power_level_sel(PC) value and the default path_loss_def value, the PC 106 may determine an input signal level value at the mobile telephone 114, RX_input_level(MT), as shown in equation [1]. The PC 106 may determine a BT_MIL value based on, for example, BT specification and/or standards documents. The PC 106 may determine a transmitted power level value, TX_power_level, for signals transmitted by the PC 106 to the mobile telephone 114, which is the minimum value between the TX_power_level_sel(PC) value and the BT_MIL value as shown in the following equation:

$$TX\_power\_level(PC)=\min(TX\_power\_level\_sel(PC)-\text{path\_loss\_def}, BT\_MIL) \quad [4]$$

In various embodiments of the invention, the PC 106 may determine whether signals are received via the 802.11 connection 108, the BT BR/EDR connection 116 or the BT 802.11 AMP connection based on medium access control (MAC) layer processing of protocol data units (PDUs) generated from signals received by the PC 106. The PDUs may comprise a data portion and a header portion. In an exemplary embodiment of the invention, the PC 106 may perform PHY layer processing of received signals based on BT basic rate (BR) radio transmission and BT extended data rate (EDR) radio transmission. Based on the PHY layer BT BR and/or BT EDR processing of received signals, the PC 106 may determine that the received signals were received via a BT BR/EDR connection 116.

In addition, the PC 106 may perform PHY layer processing of received signals as set forth in the IEEE 802.11 specification and/or standard. Based on the PHY layer 802.11 processing of received signals, the PC 106 may determine that the received signals were received via an 802.11 connection 108 or via a BT 802.11 AMP connection 118. The PC 106 may perform MAC layer processing of PDUs received via the 802.11 connection 108 or the BT 802.11 AMP connection 118 as set forth in IEEE 802.11 specification and/or standards documents. Based on the MAC layer 802.11 processing of received PDUs, the PC 106 may identify one or more address fields within each of the received PDUs. In an exemplary embodiment of the invention, the header portion of the PDUs may comprise the one or more address fields. Based on the contents of the address fields within a given PDU, the PC 106 may determine whether the contents of any of the address fields within the given PDU indicates an address, which is associated with the AP 104 or the mobile telephone 114. In instances where the PDU comprises an indicated address that is associated with the AP 104, the PC 106 may determine that the PDU was received via the 802.11 connection 108. In instances where the PDU comprises an indicated address that is associated with the mobile telephone 114, the PC 106 may determine that the PDU was received via the 802.11 connection. Upon determining whether signals are received via the 802.11 connection 108, the BT BR/EDR connection 116 or the BT 802.11 AMP connection 118, the PC 106 may practice BT 802.11 AMP TPC, in accordance with an embodiment of the invention.

In various embodiments of the invention, the PC 106 may transmit PDUs via transmitted signals, which are communicated to the mobile telephone 114 via the BT 802.11 AMP connection 118. The transmitted power level for the signals transmitted by the PC 106 via the BT 802.11 AMP connection 118 may be determined in accordance with an embodiment of the invention. Upon successful reception of the PDUs, the mobile telephone 114 may transmit one or more acknowledgment PDUs (ACKs) to the PC 106 via the BT 802.11 AMP connection 118. Subsequent to transmitting the PDUs, the PC 106 may whether one or more corresponding ACKs have been received in response to the transmitted PDUs. Upon receipt of an ACK, the PC 106 may determine that the corresponding PDU transmission to the mobile telephone 114 was successful. In instances where the PC 106 determines that an ACK has not been received, the PC 106 may determine that the corresponding PDU transmission to the mobile telephone 114 may not have been successful.

In instances where the PC 106 determines that one or more PDU transmissions has been successful, the PC 106 may continue to transmit signals via the BT 802.11 AMP connection 118 based on the current TX_power_level(PC) value. In instances where the PC determines that one or more PDU transmissions has been successful, the PC 106 may select a TX_power_level_sel(PC) value, which is greater than the current TX_power_level (PC) value. The PC 106 may determine an RX_input_level(MT) based on the selected TX_power_level_sel(PC) value and a determined path_loss (PC_MT) value. In instances where the RX_input_level(MT) is not greater than the MIL(MT) value for the mobile telephone 114, the PC 106 may transmit subsequent signals via the BT 802.11 AMP connection 118 based on the selected TX_power_level_sel(PC) value.

The PC 106 may be operable to determine a path_loss (PC_MT) adjustment value, δpath_loss, as shown in the following equation:

$$\delta\text{path\_loss}=TX\_power\_level\_sel(PC)-\text{current\_}TX\_power\_level(PC) \quad [5]$$

where current_TX_power_level(PC) refers to the current TX_power_level(PC). An adjusted path_loss(PC_MT) value may be computed based on the current path loss value and the path loss adjustment value as shown in the following equation:

$$\text{path\_loss}(PC\_MT)=\text{current\_path\_loss}(PC\_MT)+\delta\text{path\_loss} \quad [6]$$

where current_path_loss(PC_MT) refers to the current path loss value.

In an exemplary embodiment of the invention, in instances where the PC 106 determines that one or more PDU transmissions may have been unsuccessful, the PC 106 may continue to transmit signals via the BT 802.11 AMP connection 118 based on the current TX_power_level(PC) value. In instances where the PC determines that one or more PDU transmissions may have been unsuccessful, the PC 106 may select a TX_power_level_sel(PC) value, which is less than the current TX_power_level(PC) value. The PC 106 may transmit subsequent signals via the BT 802.11 AMP connection 118 based on the selected TX_power_level_sel(PC) value. The PC 106 may determine an adjusted path_loss (PC_MT) value as shown, for example, in equations [5] and [6].

Figure 2:
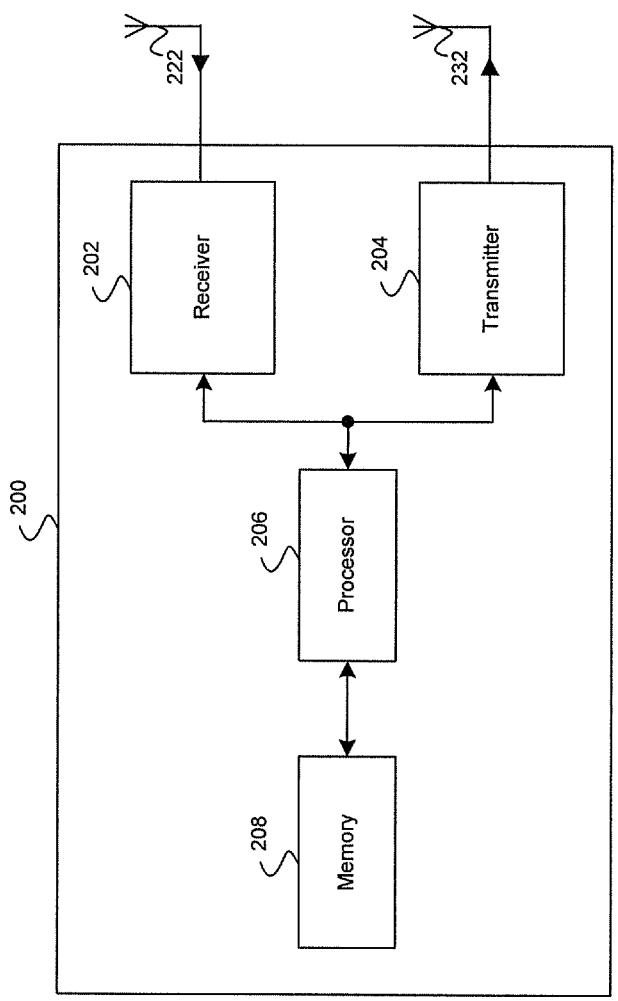
FIG. 2 is an exemplary wireless communication device, in accordance with an embodiment of the invention.

FIG. 2 is an exemplary wireless communication device, in accordance with an embodiment of the invention. Referring to FIG. 2, there is shown a transceiver system 200, which utilizes a receiving antenna 222 and a transmitting antenna 232. Various embodiments of the invention may be practiced when the transceiver system 200 utilizes a plurality of receiving antennas 222 and/or transmitting antennas 232. The transceiver system 200 may be exemplary of the PC 106. The transceiver system 200 may comprise at least a receiver 202, a transmitter 204, a processor 206, and a memory 208. Although a transceiver system 200 is shown in FIG. 2, which comprises a receiver 202 and a transmitter 204, the transmit and receive functions may be implemented in separate systems.

The receiver 202 may comprise suitable logic, circuitry, interfaces and/or code that may be operable to perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The data generated by the receiver 202 may be communicated to the processor 206.

The receiver 202 may comprise suitable logic circuitry and/or code that may be operable to perform PHY layer functions as specified in relevant BT specifications and/or standards, for example, BT Core Specification version 1.1, BT Core Specification version 2.1 and/or BT Core Specification version 3.0+HS. The receiver 202 may also be operable to perform PHY layer functions as specified in relevant IEEE specifications and/or standards, for example, IEEE 802.11a, IEEE 802.11b IEEE 802.11g and/or IEEE 802.11n. The receiver 202 may perform PHY layer functions as specified in the BT Core Specification version 1.1 and/or BT Core Specification version 2.1 to determine whether a signal received via the receiving antenna 222 is received via the BT BR/EDR connection 116. The receiver 202 may perform PHY layer functions as specified in IEEE 802.11a, IEEE 802.11b, IEEE 802.11g, IEEE 802.11n and/or BT Core Specification version 3.0+HS to determine whether a signal received via the receiving antenna 222 is received via the 802.11 connection 108 and/or the BT 802.11 AMP connection 118.

The transmitter 204 may comprise suitable logic, circuitry, interfaces and/or code that may be operable to perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted the transmitting antenna 232.

The transmitter 204 may be operable to perform PHY layer functions as specified in relevant BT specifications and/or standards, comprising, for example, the BT Core Specification version 1.1, the BT Core Specification version 2.1 and/or the BT Core Specification version 3.0+HS. The transmitter 204 may perform PHY layer functions as specified in relevant IEEE specifications and/or standards, comprising, for example, IEEE 802.11a, IEEE 802.11b IEEE 802.11g and/or IEEE 802.11n. The transmitter 204 may also be operable to perform PHY layer functions as specified in the BT Core Specification version 1.1 and/or the BT Core Specification version 2.1 when transmitting signals via the BT BR/EDR connection 116. The transmitter 204 may perform PHY layer functions as specified in exemplary standards comprising IEEE 802.11a, IEEE 802.11b, IEEE 802.11g and/or IEEE 802.11n when transmitting signals via the 802.11 connection 108. The transmitter 204 may perform PHY layer function as specified in the BT Core Specification version 3.0+HS when transmitting signals via the BT 802.11 AMP connection 118.

The processor 206 may comprise suitable logic, circuitry, interfaces, and/or code that may be operable to receive data from the receiver 202. The data may comprise a MAC layer PDU, for example. The processor 206 may perform MAC layer functions as specified in relevant BT specifications and/or standards, for example, the BT Core Specification version 1.1, the BT Core Specification version 2.1 and/or the BT Core Specification version 3.0+HS. The processor 206 may be operable to perform MAC layer functions as specified in relevant IEEE specifications and/or standards, for example, IEEE 802.11a, IEEE 802.11b IEEE 802.11g and/or IEEE 802.11n. The processor 206 may also be operable to perform MAC layer functions as specified in the BT Core Specification version 1.1 and/or BT Core Specification version 2.1 when the receiver 202 determines that signals from which the MAC layer PDU was generated were received via the BT BR/EDR connection 116. The processor 206 may perform MAC layer functions as specified in the BT Core Specification version 1.1 and/or the BT Core Specification version 2.1 when generating MAC layer PDUs for transmission via the BT BR/EDR connection 116.

The processor 206 may perform MAC layer functions as specified in one or more exemplary standards comprising IEEE 802.11a, IEEE 802.11b IEEE 802.11g and/or IEEE 802.11n when the receiver 202 determines that signals from which the MAC layer PDU was generated were received via the 802.11 connection 108 and/or the BT 802.11 AMP connection 118. The processor 206 may determine that the MAC layer PDU was received via the 802.11 connection 108 based on the contents of one or more address fields within the received MAC layer PDU. For example, in instances where the MAC layer PDU comprises an address, which is associated with the AP 104, the processor 206 may determine that the MAC layer PDU was received via the 802.11 connection 108. The processor 206 may perform MAC layer functions as specified in one or more exemplary standards comprising IEEE 802.11a, IEEE 802.11b IEEE 802.11g and/or IEEE 802.11n when generating MAC layer PDUs for transmission via the 802.11 connection 108.

The processor 206 may be operable to perform MAC layer functions as specified in the BT Core Specification version 3.0+HS when the receiver 202 determines that signals from which the MAC layer PDU was generated were received via the 802.11 connection 108 and/or the BT 802.11 AMP connection 118. The processor 206 may determine that the MAC layer PDU was received via the BT 802.11 AMP connection 118 based on the contents of one or more address fields within the received MAC layer PDU. For example, in instances where the MAC layer PDU comprises an address, which is associated with the mobile telephone 114, the processor 206 may determine that the MAC layer PDU was received via the BT 802.11 AMP connection 118. The processor 206 may perform MAC layer functions as specified in the BT Core Specification version 3.0+HS when generating MAC layer PDUs for transmission via the BT 802.11 AMP connection 118.

The memory 208 may comprise suitable logic, circuitry, interfaces and/or code that may enable storage and/or retrieval of data and/or code. The memory 208 may comprise computer readable media, having stored thereupon, a computer program having at least one code section executable by a computer and/or processor 206, thereby causing the computer and/or processor 206 to perform steps as for Bluetooth 802.11 alternate MAC/PHY (AMP) transmit power control (TPC), in accordance with an embodiment of the invention. Various embodiments of the invention may also be practiced when the processor 206 comprises at least a portion of the memory 208.

The memory 208 may utilize one or more of a plurality of storage medium technologies, such as volatile memory, for example random access memory (RAM), and/or non-volatile memory, for example electrically erasable programmable read only memory (EEPROM). In the context of the present application, the memory 208 may enable storage of code for the computation and storage of RX_input_level values, TX_power_level values, path_loss values and maximum input level (MIL) values as shown in equations [1]-[6], for example. The memory 208 may be operable to store code and/or data, which enables the processor 206 to determine whether a received MAC layer PDU was received via an 802.11 connection 108, a BT BR/EDR connection 116 and/or a BT 802.11 AMP connection 118. The memory 208 may also be operable to store address field values, which enables the processor 206 to determine whether a received MAC layer PDU was received via an 802.11 connection 108 or via a BT 802.11 AMP connection 118

In operation the processor 206 may be operable to compute RX_input_level values, TX_power_level values, path_loss values and maximum input level (MIL) values as shown in equations [1]-[6], for example. The computed RX_input_level values, TX_power_level values, path_loss values and/or maximum input level (MIL) values may be utilized for generating signals that are transmitted via a BT 802.11 AMP connection 118.

Figure 3:
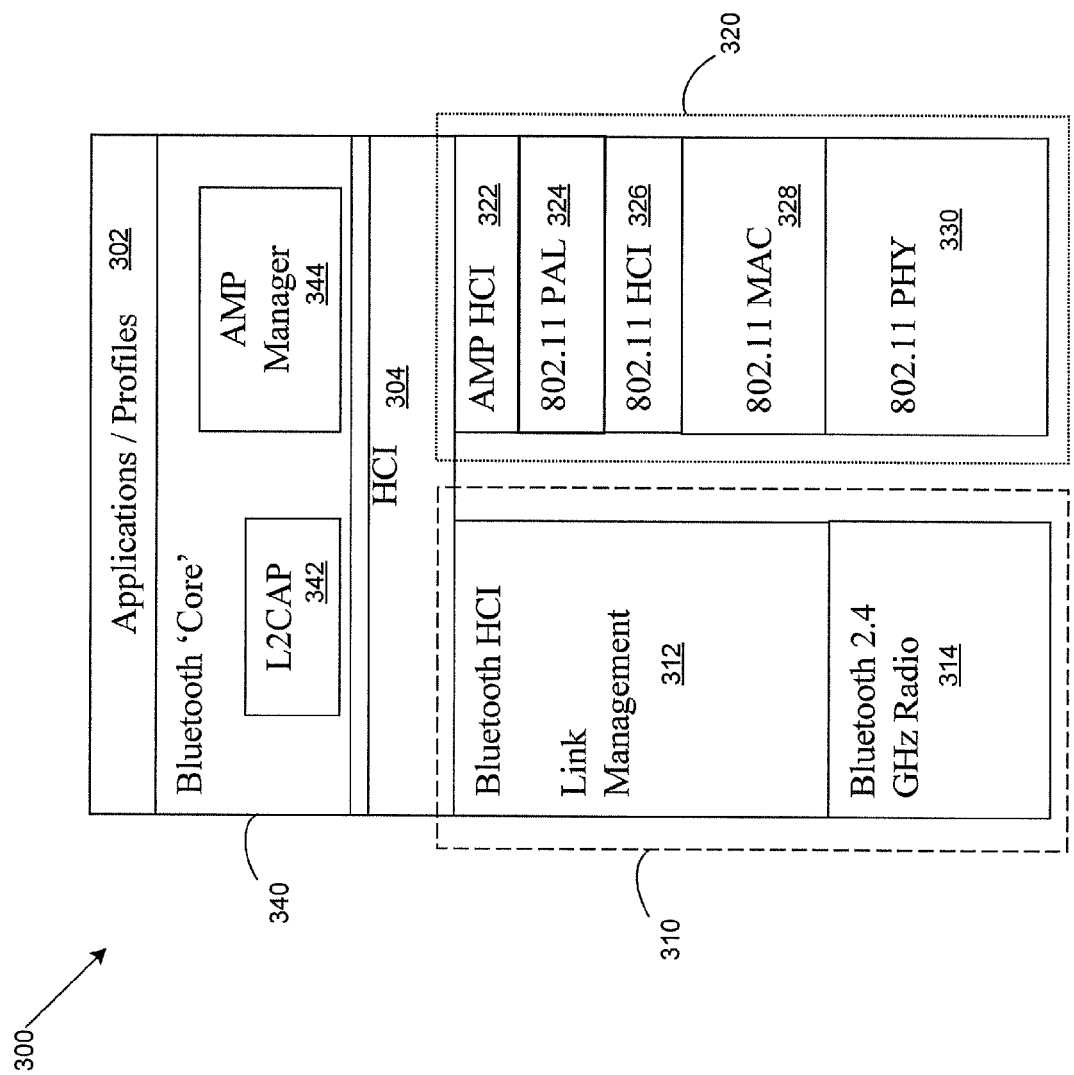
FIG. 3 is an illustration of an exemplary protocol stack for Bluetooth 802.11 AMP TPC, in accordance with an embodiment of the invention.

FIG. 3 is an illustration of an exemplary protocol stack for Bluetooth 802.11 AMP TPC, in accordance with an embodiment of the invention. Referring to FIG. 3, there is shown an exemplary BT protocol stack 300. The BT protocol stack 300 may comprise an applications and profiles layer 302, a BT core layer 340, a BT host controller interface (HCI) layer 304, a BT BR/EDR protocol stack 310 and a BT+HS protocol stack 320. The BT core layer 340 may comprise a logical link control and adaptation layer protocol (L2CAP) 342 and an AMP manager 344. The BT BR/EDR stack 310 may comprise a BT HCI and link management layer 312 and a BT radio layer 314. The BT+HS stack 320 may comprise an AMP HCI layer 322, an 802.11 protocol adaptation layer (PAL) 324, an 802.11 HCI layer 326, an 802.11 MAC layer 328 and an 802.11 PHY layer 330.

In operation the BT radio layer 314 and the 802.11 PHY layer 330 may be performed in the receiver 202 and/or transmitter 204. The BT HCI and link management layer 312, 802.11 MAC layer 328, 802.11 HCI layer 326, 802.11 PAL layer 324 AMP HCI 322, HCI layer 304, BT core layer 340 and applications/profiles layer 302 may be performed in the processor 206.

In an exemplary embodiment of the invention, the mobile telephone 114 may transmit signals to the PC 106 via the BT BR/EDR connection 116 during an association phase. The mobile telephone 114 may transmit MIL(MT) information via the transmitted signals. The receiver 202 within the PC 106 may perform BT radio layer 314 processing on the signals received via the BT BR/EDR connection 116. During the BT radio layer 314 processing the receiver 202 may compute a BT RSSI value based on the received signals. The receiver 202 may also be operable to generate the MIL(MT) information based on the received signals. The receiver 202 may communicate the computed BT RSSI value and/or the generated MIL(MT) information to the processor 206. The processor 206 may perform BT HCI and link management 312 layer functions to receive the BT RSSI value and/or generated MIL(MT) information and to pass the BT RSSI value and/or generated MIL(MT) information to the HCI 304 layer. The HCI 304 layer processing may pass the BT RSSI value and/or generated MIL(MT) information to the L2CAP 342 layer. The L2CAP 342 layer may pass the BT RSSI value and/or generated MIL(MT) information to the AMP manager 344 layer. The AMP manager 344 may pass the BT RSSI value and MIL(MT) information to the HCI 304, which may pass the BT RSSI value and MIL(MT) information to the BT+HS protocol stack 320.

The BT+HS protocol stack 320 may be operable to generate signals for transmission via the BT 802.11 AMP connection 118. The AMP HCI 322 may receive the BT RSSI value and MIL(MT) information from the HCI 304. The AMP HCI 322 may pass the BT RSSI value and MIL(MT) information to the 802.11 PAL 324. The 802.11 PAL 324 may be operable to adapt the 802.11 MAC layer and the 802.11 PHY layer for BT+HS radio transmission. During 802.11 PAL 324 layer processing, for example, the processor 206 may compute RX_input_level values, TX_power_level values, path_loss values and maximum input level (MIL) values as shown in equations [1]-[6], for example. The processor 206 may store the received BT RSSI value, generated MIL(MT) information, and/or computed RX_input_level values, TX_power_level values, path_loss values and maximum input level (MIL) values in the memory 208, for example. In various embodiments of the invention, the processor 206 may retrieve a stored path_loss value and/or MIL value, for example, a default path loss value or an MIL value, from the memory 208.

When the processor 206 within the PC 106 subsequently generates data for transmission to the mobile telephone 114 via the BT 802.11 AMP connection 118, the data may be generated in the application/profiles layer 302, the data may be pass down the BT protocol stack 300 to the BT+HS stack 320. The 802.11 PAL 324 may determine a TX_power_level for signal transmission via the BT 802.11 AMP connection 118. The 802.11 MAC layer 328 may receive the data and perform MAC layer functions as specified in relevant IEEE specifications and/or standards comprising, for example, IEEE 802.11a, IEEE 802.11b IEEE 802.11g and/or IEEE 802.11n, for example. The MAC layer 328 may generate a MAC layer PDU based on the received data. The MAC layer PDU may comprise one of more address fields, wherein at least one address field, for example a source address field, may comprise an address that is associated with the PC 106, and at least one address field, for example a destination address field, may comprise an address that is associated with the mobile telephone 114. The MAC layer PDU may be sent to the 802.11 PHY layer 330.

The 802.11 PHY layer 330 may perform PHY layer function as specified in relevant IEEE specifications and/or standards, for example, comprising IEEE 802.11a, IEEE 802.11b IEEE 802.11g and/or IEEE 802.11n. The 802.11 PHY layer 330 may generate a PHY layer PDU, which comprises the MAC layer PDU and preamble information, for example. The 802.11 PHY layer 330 may receive a TX_power_level value, which was determined in the 802.11 PAL 324. The 802.11 PHY 324 may utilize the TX_power_level value for TPC over signals transmitted by the transmitter 204 via the transmitting antenna 232. The 802.11 PHY 324 may generate signals operable for the transmission of the PHY layer PDU from the PC 106 to the mobile telephone 114 via the BT 802.11 AMP connection 118. The transmitting power for the generated signals may be determined based on the TX_power_level value received from the 802.11 PAL 324.

Figure 4:
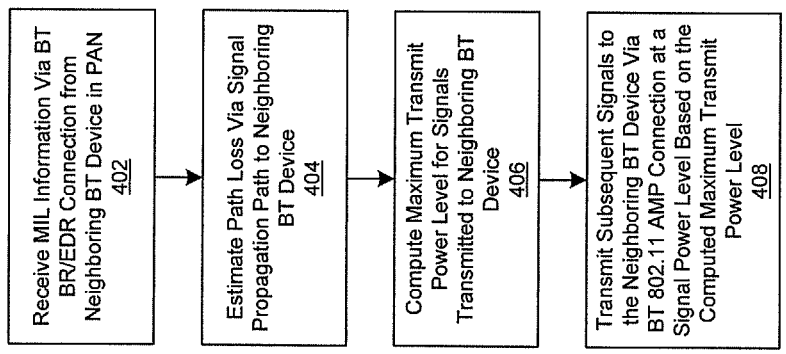
FIG. 4 is a flowchart illustrating exemplary steps for Bluetooth 802.11 AMP transmit power control, in accordance with an embodiment of the invention.

FIG. 4 is a flowchart illustrating exemplary steps for Bluetooth 802.11 AMP transmit power control, in accordance with an embodiment of the invention. Referring to FIG. 4, in step 402 a PC 106 may receive MIL information via a BT BR/EDR connection 116 from a neighboring BT device in a PAN 112, for example the mobile telephone 114. In step 424, the PC 106 may be operable to determine a path loss value, path_loss (PC_MT), for the signal propagation path from the PC 106 to the mobile telephone 114. In step 406, the PC 106 may compute a maximum transmit power level, max(TX_power_level (PC)) for signals transmitted by the PC 106 to the mobile telephone 114. In step 408, the PC 106 may transmit subsequent signals to the mobile telephone 114 via the BT 802.11 AMP connection 118. The signal power level for the transmitted signals may be determined based on the computed max(TX_power_level(PC)) value.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Bluetooth 802.11 alternate MAC/PHY (AMP) transmit power control (TPC).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
   performing by one or more processors, one or more circuits, or any combination thereof:
   determining a maximum input level based at least in part on signals received via a Bluetooth basic rate connection, via a Bluetooth extended data rate connection, or via both said Bluetooth basic rate connection and said Bluetooth extended data rate connection;
   determining a transmitted signal power level based at least in part on said determined maximum input level;
   transmitting subsequent signals via a distinct Bluetooth connection by way of an 802.11 transceiver based at least in part on said determined transmitted signal power level; and
   determining a path loss value for said subsequent signals transmitted via said distinct Bluetooth connection.

2. The method according to claim 1, wherein determining said path loss value is based at least in part on a received signal strength indication measurement, wherein said received signal strength indication measurement is determined based at least in part on said signals received via said Bluetooth basic rate connection, said Bluetooth extended data rate connection, or both said Bluetooth basic rate connection and said Bluetooth extended data rate connection.

3. The method according to claim 1, wherein determining said transmitted signal power level is further based at least in part on said determined path loss value.

4. The method according to claim 1, wherein determining said path loss value is based at least in part on a received signal strength indication measurement, wherein said received signal strength indication measurement is determined based at least in part on signals received via a distinct network connection, wherein said distinct network connection is specified based at least in part on a distinct network communication specification, wherein said distinct network communication specification is distinct from a Bluetooth network communication specification.

5. The method according to claim 4, wherein said distinct network communication specification is Institute of Electrical and Electronics Engineers (IEEE) 802 local area network compliant.

6. The method according to claim 4, comprising determining a signal propagation path length for said distinct network connection.

7. The method according to claim 6, wherein determining said path loss value is further based at least in part on said signal propagation path length.

8. The method according to claim 1, comprising modifying said determined transmitted signal power level based at least in part on signals received via said distinct Bluetooth connection.

9. The method according to claim 8, comprising modifying said determined transmitted signal power level based at least in part on one or more acknowledgment protocol data units received via said distinct Bluetooth connection.

10. A system for communicating data, the system comprising:
- one or more circuits, one or more processors, or any combination thereof that are operable to determine a maximum input level based at least in part on signals received via a Bluetooth basic rate connection, via a Bluetooth extended data rate connection, or via both said Bluetooth basic rate connection and said Bluetooth extended data rate connection;
- said one or more circuits, said one or more processors, or any combination thereof are operable to determine a transmitted signal power level based at least in part on said determined maximum input level;
- said one or more circuits, said one or more processors, or any combination thereof are operable to transmit subsequent signals via a distinct Bluetooth connection by way of an 802.11 transceiver based at least in part on said determined transmitted signal power level; and
- said one or more circuits, said one or more processors, or any combination thereof are operable to determine a path loss value for said subsequent signals transmitted via said distinct Bluetooth connection.

11. The system according to claim 10, wherein said path loss value is determined based at least in part on a received signal strength indication measurement, wherein said received signal strength indication measurement is determined based at least in part on said signals received via said Bluetooth basic rate connection, said Bluetooth extended data rate connection, or both said Bluetooth basic rate connection and said Bluetooth extended data rate connection.

12. The system according to claim 10, wherein said transmitted signal power level is further based at least in part on said determined path loss value.

13. The system according to claim 10, wherein said path loss value is determined based at least in part on a received signal strength indication measurement, wherein said received signal strength indication measurement is determined based at least in part on signals received via a distinct network connection, wherein said distinct network connection is specified based at least in part on a distinct network communication specification, wherein said distinct network communication specification is distinct from a Bluetooth network communication specification.

14. The system according to claim 13, wherein said distinct network communication specification is Institute of Electrical and Electronics Engineers (IEEE) 802 local area network specification compliant.

15. The system according to claim 13, wherein said one or more circuits, said one or more processors, or any combination thereof are operable to determine a signal propagation path length for said distinct network connection.

16. The system according to claim 15, wherein said path loss value is determined further based at least in part on said signal propagation path length.

17. The system according to claim 10, wherein said one or more circuits, said one or more processors, or any combination thereof are operable to modify said determined transmitted signal power level based at least in part on signals received via said distinct Bluetooth connection.

18. The system according to claim 17, wherein said one or more circuits, said one or more processors, or any combination thereof are operable to modify said determined transmitted signal power level based at least in part on one or more acknowledgment protocol data units received via said distinct Bluetooth connection.

19. A system for communicating data, the system comprising:
- means for determining a maximum input level based at least in part on signals received via a Bluetooth basic rate connection, via a Bluetooth extended data rate connection, or via both said Bluetooth basic rate connection and said Bluetooth extended data rate connection;
- means for determining a transmitted signal power level based at least in part on said determined maximum input level;
- means for transmitting subsequent signals via a distinct Bluetooth connection by way of an 802.11 transceiver based at least in part on said determined transmitted signal power level; and
- means for determining a path loss value for said subsequent signals transmitted via said distinct Bluetooth connection.

20. The system according to claim 19, wherein said path loss value is determined based at least in part on a received signal strength indication measurement, wherein said received signal strength indication measurement is determined based at least in part on said signals received via said Bluetooth basic rate connection, said Bluetooth extended data rate connection, or both said Bluetooth basic rate connection and said Bluetooth extended data rate connection.

21. The system according to claim 19, wherein said transmitted signal power level is further based at least in part on said determined path loss value.

* * * * *